United States Patent Office 2,730,286
Patented Jan. 10, 1956

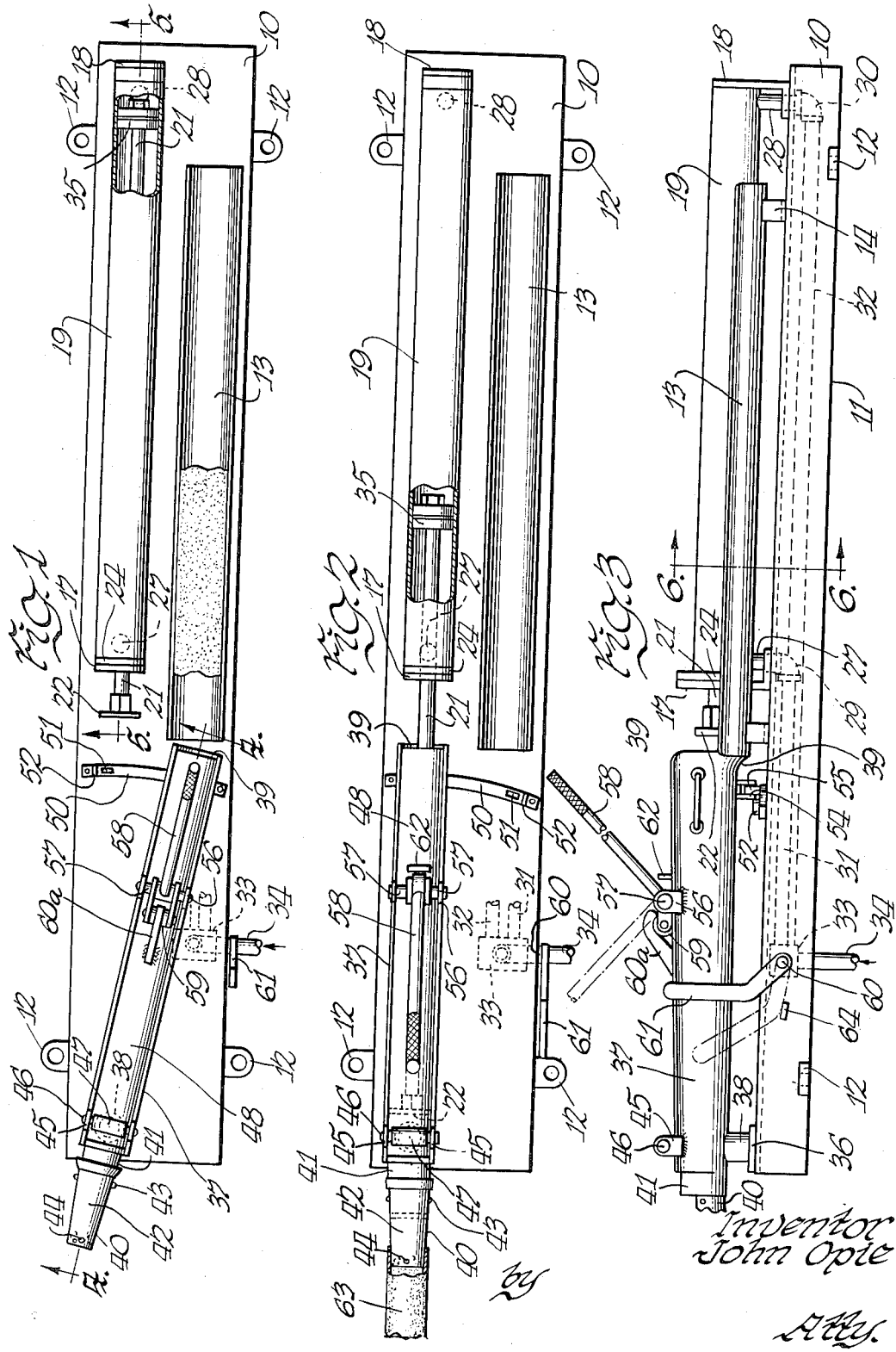

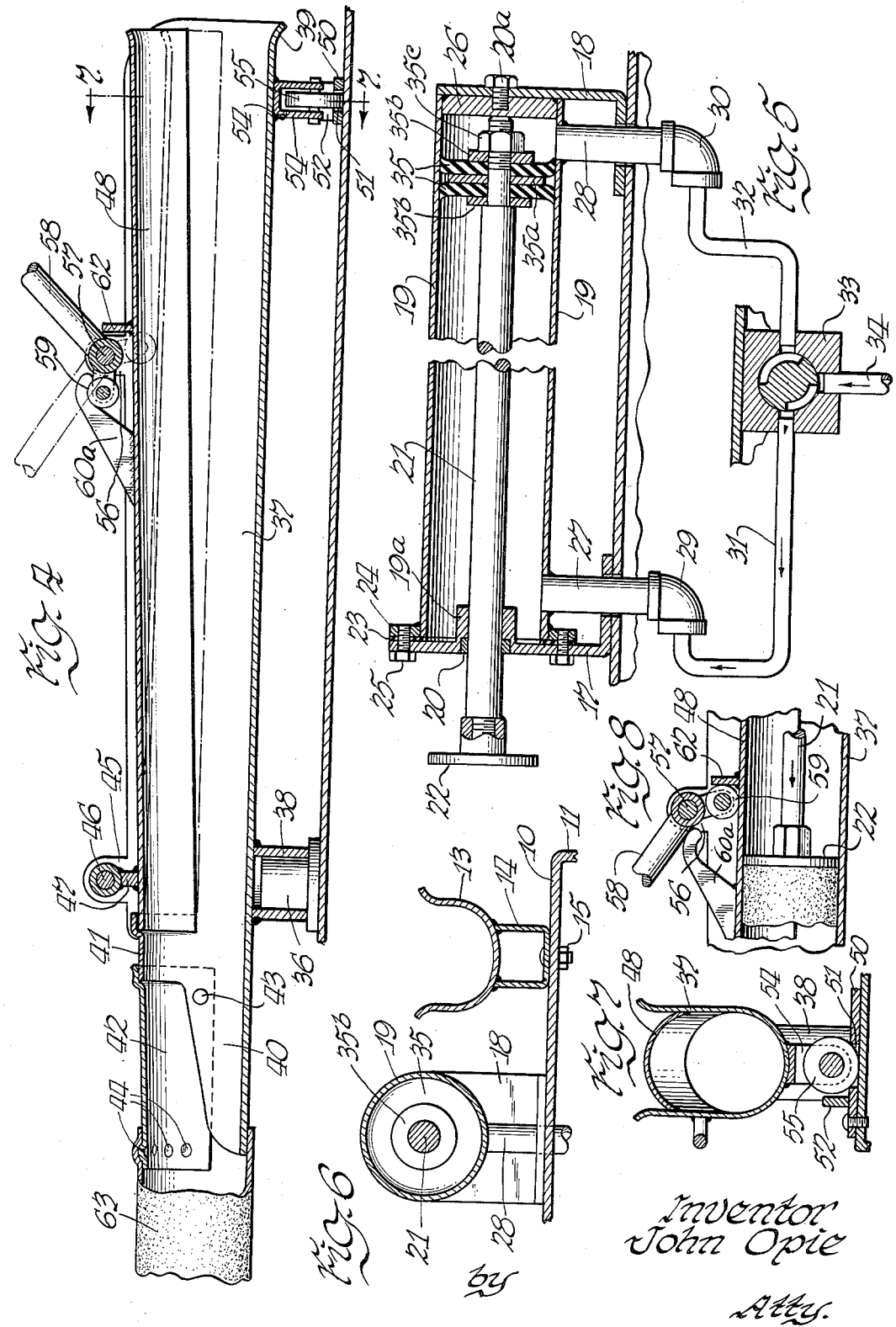

2,730,286
MACHINE FOR COMPRESSING MEAT BODIES AND FOR PACKAGING SAME

John Opie, Riverside, Ill.

Application April 8, 1953, Serial No. 347,503

7 Claims. (Cl. 226—101)

This invention is directed to novel improvements in presses or machines for compressing meat, either single pieces or a large number of pieces, into an elongated predetermined shape so that the compressed and preformed mass may be easily pushed into a tube-like casing.

It is an important object of my invention to provide an automatic machine of the described class for compressing meat or the like into desired elongated shapes suitable for insertion into the walled casings in which the same are marked and which includes a removably mounted meat receiving trough; a movable and adjustable mounted cylinder having an openable side portion and a movable closure for said openable side portion; an air operated piston and plunger and an air cylinder, and manually operable means for selectively reciprocating said piston and plunger, said plunger being adapted to compress the meat mass in said meat receiving cylinder preparatory to expulsion thereof as a compressed body into a suitable casing.

A further object of my invention is the provision in combination with an air operated plunger and piston, of a compression casing having a long side opening and pivotally mounted for horizontal movement and having an arcuate plate or wall movably mounted and adapted to be pressed inwardly into the casing so as to compress the mass which has been pushed into the casing, into a substantially cylindrical form, and also having manually lever means for effecting the transverse pressure to the meat mass in said casing.

A further object of my invention is the provision of the combination of a horizontal elongated meat receiving trough into which the meat mass is first placed; a horizontally pivotal compression casing having a lever operated movable and pivoted side wall, and an air operated reciprocable plunger adapted to selectively move into said casing when the casing has been mutually removed into alignment with said plunger, whereby the meat mass will be compressed in said casing; and wherein casing carries an expandable nozzle adapted to have a flexible casing mounted on it, said plunger, during the latter part of its forward movement being adapted to push the compressed meat mass into said flexible casing.

Other and further important objects of my invention will be apparent from the following description and appended claims.

Fig. 1 is a top plan view of my novel pressing and packaging machine, with parts broken away.

Fig. 2 is a top plan view of said machine showing the plunger and its piston in projected position and with the plunger within the casing.

Fig. 3 is a side elevation of my said machine, and with the nozzle removed.

Fig. 4 is an enlarged view of the horizontally pivotal casing and mounting means for same, and with certain parts in cross section or broken away.

Fig. 5 is an enlarged cross sectional view of the air cylinder, piston, plunger and a part of the air conduit means connecting the said piston to a compressed air source, and with parts broken away.

Fig. 6 is a cross section taken on line 6—6 of Fig. 3.

Fig. 7 is an enlarged cross section taken on line 7—7 of Fig. 4.

Fig. 8 is a fragmentary cross section, with parts broken away, of the head of the plunger and a part of the compression casing and the lever for depressing the baffle or wall of said casing.

As shown on the drawings:

Referring to Figs. 1 to 4, numeral 10 designates an elongated base of substantially rectangular form and preferably of metal, and which includes depending side walls 11 having integral apertured horizontally extending ears 12 by means of which the machine may be easily secured to a suitable table or bench with the aid of bolts or screws (not shown).

Mounted on one side portion of base 10 is a curved metal trough or hopper 13 having an apertured metal channel 14 secured thereto by welding, as shown in Fig. 6. Bolts 15 extend through holes in said channel and into holes in base 10 to secure said hopper or trough 13 in stationary position along one edge of base 10.

Secured to base 10 and at the opposite side edge of base 10 are two spaced apart right-angled apertured brackets, as shown in Figs. 2, 3 and 5. A metal cylinder 19 is mounted between said brackets 17 and 18, as shown in Figs. 2, 3 and 5. Forward bracket 17 has an inwardly extending central boss 19a which defines a round opening in which is mounted a ring bearing 20 through which the rod 21 of plunger 22 slides. A ring gasket 23 is impinged between bracket 17 and the end of cylinder 19 and an annular ring or collar 24 which is secured by bolts 25 to the bracket 17, as shown at the left of Fig. 5.

An end block or bumper 26 is mounted in the rear end of cylinder 19 by means of screw 20a which threads through an aperture in bracket 18 and into said block. Plunger head 22 has a threaded hub which threads on the threaded end of rod 21, as shown in Fig. 5.

Piston 35 is composed of two stiff rubber disks with an interposed washer or spacer 35a and these are secured between two washers 35b on the reduced threaded end of rod 21 by means of a nut 35c. The peripheries of rubber piston 35 are held snug against the inner wall of cylinder 19 though slidable therein.

Numerals 27 and 28 are air conduits or pipes which have one end of each thereof mounted and sealed in two openings at opposite ends of cylinder 19, preferably by welding, as shown in Fig. 5. Numerals 29 and 30 are elbows and these connect conduits 27 and 28 to tubes or pipes 31 and 32 which have their opposite ends connected to the two ports of a three-way valve 33 which is shown diagrammatically in Fig. 5. The housing of valve 33 has an inlet port and conduit 34 which is communicatively connected to a compressed air source (not shown). The rotatable valve element of valve 33 is adapted to be selectively operated by means of a conveniently located hand lever (not shown).

It will be understood that valve operation to admit air to pipes 31 and 27 will admit compressed air in front of piston 35 to retract said piston and plunger and at the same time open an exhaust port of valve 33 (not shown) to permit expulsion of most air from behind the piston 35 during its retraction. When valve 33 is manually operated to admit compressed air into pipes 32 and 28 and simultaneously communicate the pipe 31 to the exhaust port of said valve, the piston 35 and plunger 22 will be forced forward to extreme position to the limit permitted by the piston.

Referring to Figs. 3 and 4, numeral 36 designates a pivot stud, pin or post which is secured to base 10 adjacent the left end thereof. Numeral 37 is an elongated metal channel-like casing or trough opening upwardly, a cross section thereof being shown in Fig. 7. The inner end of the open-sided trough 37, which partially defines a compression chamber, is beveled or flared outwardly, as at 39, as indicated in Fig. 3, so that in material receiving position such flared integral end portion will be below and outside of the end edge of hopper 13. A ring or hub 38 is secured by welding on the lower face of casing 37 and it rotatably and removably engages post 36 so that a bearing is provided for horizontal movement of casing 37 and so that said casing and ports carried by it may be easily removed for cleaning. The outlet end of trough or casing 37 has an outwardly extending discharge spout 40 whose side edges curve outwardly and downwardly. Casing 37 has an integral ring portion 41 which at this point substantially defines a circle (see left of Fig. 4 and Fig. 2). The forward edge of ring portion 41 is bent and offset outwardly, as shown at left of Fig. 4.

A substantially semi-cylindrical metal nozzle section or hood 42 has apertures adjacent two corners thereof in which two pins, pivots or removable bolts 43 are mounted diametrically opposite each other, so that hood 42 is pivotal outwardly and inwardly so that the size of the adjustable nozzle or spout formed by hood 42 and spout 40 may be varied. Hood 42 preferably has a plurality of integral lugs or abutments 44 adjacent its outer end edge and these, by frictional engagement, assist in temporarily holding a flexible casing or transparent enveloping container into which the compressed meat mass is forced by the hereindescribed action.

Referring to Figs. 1 to 4 inclusive, numerals 45 designate two upwardly extending apertured mounting ears or lugs which extend upwardly from the opposite side edges of casing 37 and these are welded to said casing. A cross pin 46 is preferably removably mounted in the aligned holes of ears 45 and this forms a bearing and pivot for hinge member 47 which is secured by welding to the end portion of an elongated movable cover plate or pressure plate 48 which is of arcuate cross section, as shown in Fig. 7. Pressure plate 48 is of a length extending substantially to the flared inlet end of casing 37. It will be noted from Fig. 7 that the pressure plate 48 is of a width so that it seats between the opposed side walls of casing 37, and when at its lowermost position (shown in dotted lines in Fig. 4), the said plate and the casing portion below it define a cylindrical chamber.

Referring to Figs. 1 to 4, I mount an arcuate metal grooved track 50 horizontally on the upper face of base 10 below the inlet end portion of casing 37, this track being secured to said base, for example by rivets as shown so that it is in the radius of the axis of post 36. Track 50 has secured thereon upwardly extending stop lugs 52 adjacent the opposite ends thereof which stop the manually imparted rolling of caster, wheel or roller 55. Roller 55 is journalled by a pin between the arms of a bifurcated member or bracket 54 which is secured on the lower face of casing 37, preferably by welding. Track 50 has a pair of slots or recesses 51 formed therein just inward of the two lugs 52, respectively, and the roller 55 seats into said slots at the two extreme positions of the casing 37 so that said casing will temporarily remain in the position desired by the operator.

Numerals 56 represent two upwardly extending apertured metal ears which are secured by welding to the opposite side walls of casing 37. A metal lever 58 having a transversely passaged integral knuckle is fulcrumed by cross pin 57 with respect to ears or lugs 56. The normally lower end portion of lever 58 is bifurcated and slightly bent out of alignment with the axis of said lever, and carries a roller 59 (see Figs. 3, 4 and 8), journalled thereon by means of a cross pin mounted in said bifurcated lever end portion. Numeral 60 is an upwardly extending metal hook or arm which has one end portion secured by welding to the intermediate portion of pressure plate 48 and in such position that the upper end portion thereof overlies the roller 59 a portion of the time (see Figs. 1, 3 and 4). As shown in Figs. 4 and 8, a stop lug 62 is secured to plate 48 by welding to limit the movement of lever 58 to the left in Figs. 1 to 3 and Fig. 8, and in plate depressing position.

It will be understood that when the lever 58 is moved to the right hand position toward air cylinder 19, the roller 59 engages hook 60 to hold the pressure plate in the upper position illustrated in Fig. 4, and when lever 58 is manually moved to the left, the roller 59 engages the pressure plate 48 to depress said plate 48 into extreme lowered position, as illustrated by dotted lines in Fig. 4.

It will be understood that the three-way valve 33 is preferably located in a position near the trough or casing, for example, such as illustrated in Fig. 3, so that same may be convenient to the operator who normally stands facing the side of base 10 shown as the lower side in Figs. 1 and 2. The movable element of valve 33 has a projecting shaft 60 on which is mounted an upwardly extending angular lever 61 which the operator will normally operate with his left hand to effect either the projection or retraction of plunger 22.

A stop lug 64, shown in Fig. 3 is mounted on the side wall of base 10 to limit the downward rocking movement of lever 61. When lever 61 is in the full line position of Fig. 3, the valve 33 is opened to admit compressed air into the forward part of the cylinder and at the same time exhaust partially the air rearward of the piston, to thereby retract the piston 35 and plunger 22. When the lever 61 is moved to the left or to the dotted line position of Fig. 3, the compressed air is admitted behind the piston 35 (at the same time exhausting partially the air in front of said piston), so that the plunger 22 will be projected to move into the closed trough in which the mass has been partially compressed by the depression of pressure plate 48. Such projection of the plunger 22 continues as the meat mass is compressed, due partially to the friction between the meat mass and trough 37 and the pressure plate, and thereby when a substantial degree of compression has been attained which overcomes such friction, the compressed meat mass or body will be pushed through the nozzle section 42 and into the flexible casing or containing member 63 shown at the left of Figs. 2 and 4. Due to the pivotal mounting of the hood or nozzle section 42, the meat body, as it passes through said nozzle or spout, presses the hood 42 upwardly so that the end portion of the flexible casing is thereby gripped and held with greater friction until the meat body has passed the outer end portion of the hood 42.

Thereafter an operator will remove the meat body in the enveloping casing or container for subsequent handling.

My novel machine described in the foregoing clearly speeds up the forming of pressed hams or similar meat bodies which in some instances are composed of relatively small finely divided pieces and quickly and economically mounts the same into flexible casings or coverings, for example, visking casings, so that the operator may easily remove the casing-enclosed ham or meat body and thereafter optionally tie one or both ends of the casing. Similarly my novel machine provides quick and economical means for compressing meat or food bodies to the desired shape and size and compactness and will push or mount the same into any type of open-ended container, including metal cans, wrappers and the like.

As many changes could be made in the above construction, and as many apparently widely different embodiments of my invention within the scope of the claims could be constructed without departing from the spirit and scope thereof, it is intended that all matter contained in the accompanying specification shall be interpreted as illustrative and not in a limiting sense.

I claim:

1. In a machine for compressing meat or the like and for pressing same into casings; an elongated base, an elongated hopper on said base; an elongated stuffing casing opening upwardly and having end openings; a pressure plate pivotally connected to one end of said casing and movable upwardly and downwardly into said casing; means for pivoting one end portion of said casing to provide for manual horizontal movement thereof; a manually operable lever means pivoted on said casing and above the free end portion of said pressure plate, said lever means, when actuated in one direction being adapted to press said pressure plate into said casing; a roller means on the lower free end portion of said casing and rollably supporting said casing on said base; means for limiting the horizontal movement of the free end of said casing; a horizontal air cylinder on said base, pipes for connecting the ends of said cylinder with a compressed air source; a piston slidable in said air cylinder; a plunger exterior of said cylinder and operably connected to said piston and a manually operable valve in said pipes of said cylinder; said casing being positionable in alignment with said hopper to permit manual pushing of a compressible mass into said casing, and being selectively movable into alignment with said plunger; the forward air-actuated movement of said piston and plunger being adapted to compress the material mass in said casing and to expel the same therefrom.

2. In a machine for compressing meat or the like and for pressing same into casings; an elongated base; an elongated hopper on said base; an elongated horizontally disposed trough opening upwardly; a pressure plate pivotally connected to one end portion of said trough and movable upwardly and downwardly therein; means on said base for pivoting one end portion of said trough for horizontal movement; a lever connected pivotally to said trough, and adapted to depress and raise said pressure plate; a horizontally disposed air cylinder on said base; pipe connections connected to said cylinder whereby same may be connected to a compressed air source; a piston slidable in said air cylinder; a plunger exterior of said cylinder and operably connected to said piston, and a manually operated valve in said connectors of said cylinder; said trough being positionable in alignment with said hopper and being selectively movable into alignment with said plunger; the lever-actuated depression of said pressure plate being adapted to partially compress the material placed therein; the forward air-actuated movement of said piston and plunger being adapted to compress the material mass in said casing and to expel the same therefrom.

3. In a machine for pressing and forming meat-like material into elongated rounded shapes; an elongated base; a trough-like hopper on said base; an elongated horizontally disposed trough opening upwardly; a pressure plate pivotally connected to one end portion of said trough and movable upwardly and downwardly therein; means on said base for pivoting one end portion of said trough for horizontal movement; a lever connected pivotally to said trough, and adapted to depress and raise said pressure plate; roller means carried by said trough and normally engaging said base; a horizontally disposed air cylinder on said base; pipe connections connected to said cylinder whereby same may be connected to a compressed air source; a piston slidable in said air cylinder; a plunger exterior of said cylinder and operably connected to said piston; and a manually operated valve in said connections of said cylinder; said trough being positionable in alignment with said hopper and being selectively movable into alignment with said plunger; the lever-actuated depression of said pressure plate being adapted to partially compress the material placed therein; the forward air-actuated movement of said piston and plunger being adapted to compress the material mass in said casing and to expel the same therefrom.

4. In a machine for pressing pieces of food into a body of desired shape, an elongated base, a metal substantially cylindrical trough pivoted at one end thereof to said base; a compression plate movable into and out of said trough; means for pivoting one end portion of said plate to said trough; manually actuable means connected to said trough and adapted to raise and lower said plate; an elongated hopper on said base having an opening in a position to register with said trough in one position of the latter; an air cylinder and piston on said base; manually operable mechanism for selectively reciprocating said piston; and a plunger exterior of said air cylinder and connected to said piston; said trough and plate being positionable into alignment with said plunger; the projecting movement of said plunger into said trough being adapted to compress the food pieces into desired shape and to expel the same through the outlet end of said trough.

5. A pressing machine for meats and the like substantially as recited in claim 4 and having a roller mounted on the free end of said trough; a track on said base on which said roller rolls; and stopping elements at the end of said track for limiting the horizontal movements of said trough.

6. A pressing machine for compressing food bodies and for pushing same into a casing substantially as recited in claim 4 and having a pivoted adjustable nozzle of arcuate cross section on the end of said trough; said nozzle being adjustable to vary the opening therethrough and said nozzle being adapted to temporarily engage and hold an open end of a flexible casing into which the compressed meat body is adapted to be pushed by said plunger.

7. An apparatus for forming a food body to desired shape; a supported elongated base; a substantially semi-cylindrical trough movably mounted in horizontal position on said base, said trough being pivoted adjacent one end thereof; a pressure plate pivotally mounted to move into and out of said trough, the depression of said pressure plate being adapted to normally press the food material to desired cross sectional form; a horizontally disposed cylinder on said base; a compressed air-operated piston and piston rod reciprocable in said cylinder; a plunger head on the outer end of said piston; conduit connections on said cylinder and to provide for communicatively connecting said cylinder to a source of compressed air; a manually operable valve for selectively opening and closing said conduit connections; a pressure plate pivotally connected to one end portion of said trough; a manually operable lever for raising and depressing said pressure plate; an adjustable nozzle on the discharge end of said trough and adapted to receive and temporarily hold an open ended casing; a material receiving elongated hopper on said base and spaced from said cylinder; said trough being adapted to be moved in substantial alignment with said hopper to facilitate charging of the material into said trough; and said trough being movable into a position to receive said plunger head which when projected will compress the mass in said trough and push it through said nozzle.

References Cited in the file of this patent

UNITED STATES PATENTS

| | | |
|---|---|---|
| 1,228,416 | Drolet, Sr. | June 5, 1917 |
| 2,337,406 | Opie | Dec. 21, 1943 |